Nov. 6, 1934.  F. L. CONE  1,979,367
WORK HOLDING MECHANISM
Original Filed Dec. 9, 1931
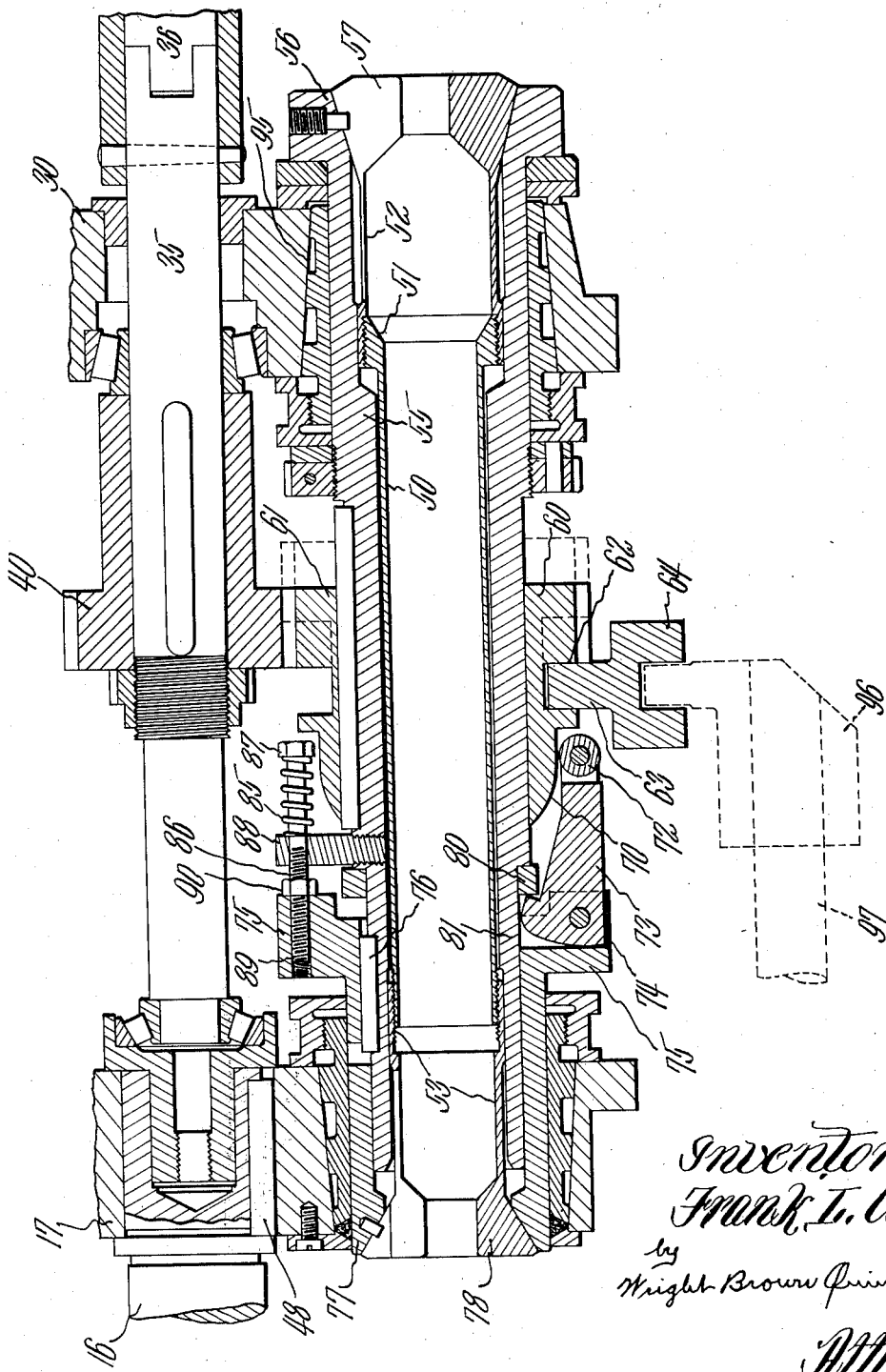

Patented Nov. 6, 1934

1,979,367

UNITED STATES PATENT OFFICE 1,979,367

WORK HOLDING MECHANISM

Frank L. Cone, Windsor, Vt.

Original application December 9, 1931, Serial No. 579,914. Divided and this application May 15, 1933, Serial No. 671,054

3 Claims. (Cl. 82—30)

This invention relates to mechanism for holding and rotating work, more particularly bar stock, in such a manner that both ends of the work are left free for machining operations thereon.

In accordance with this invention means are provided for gripping the work adjacent to both ends of the holding mechanism, this gripping means preferably being so arranged as to equalize the gripping pressure therebetween, means being provided by which the gripping means may be actuated simultaneously to grip or release the work.

For a more complete understanding of this invention, reference may be had to the accompanying drawing which represents by way of example a fragmentary longitudinal section through the turret of a multiple spindle machine in which the subject matter of this invention has been embodied in a preferred form.

This application is a division of my application Serial No. 579,914 filed December 9, 1931 for Double end automatic lathe. It should be understood, however, that this invention in its broader aspects is not limited to a multispindle machine as shown in that parent application.

Referring to the drawing, at 17 and 30 are shown end plates of a turret which, as fully shown and described in the parent application, is journaled for indexing motion about an axis to present each of a plurality of work holders in succession in definite indexed positions.

Each of the work holders comprises a central tube 50, one end of which is enlarged as at 41 and has secured thereto, as by a threaded connection, the inner end of a spring collet 52. The other end of the tube 50 is threaded for attachment of a mated threaded end of a spring collet 53. Slidable on the tube 50 is a sleeve 55 having one end formed to engage about the collet 52 and having an outer end formed beveled as at 56 to form a hood portion cooperating with a mating bevel face on the spring fingers 57 of the collet 52 so as to close the collet onto the work when the sleeve 55 is moved axially away from the turret wall 17. It will be understood, of course, that the work extends through the tube 50 and is gripped at spaced points by the collets 52 and 53. The sleeve 55 extends through and has secured thereto a sleeve 60 which is provided with an integral gear portion 61 which meshes with the gear 40 carried by the shaft 35 which is a drive shaft by rotation of which the work holders may be rotated. It also is provided with a peripheral groove 62 adjacent to the gear 61 within which may rest a shoe 63 on a slide 64, which is supported for movement axially of the turret in any suitable manner as fully shown in the parent application hereinbefore mentioned. The sleeve 60 is also provided with a tapering cam face 70 at its end remote from the gear 61 with which cooperate rollers 72 on the ends of bell crank levers 73. These bell crank levers are journaled in slots 74 of a sleeve 75 which is slidably keyed to the sleeve 55 as by the key 76. The outer end of the sleeve 75 is formed as a collet hood 77 having a tapered inner face engaging the tapered outer face of the fingers 78 of the spring collet 53, so that as the collet hood 77 is moved outwardly toward the end of the collet fingers this collet is closed upon the work. The other arms of the bell crank lever 73, preferably three of these levers being employed spaced equally about the axis of the tube 50, engage a hardened wear ring 80 seated in a reduced diameter portion 81 of the sleeve 55, so that as the levers 73 are swung outwardly by the passage of the tapering end of the sleeve 60 therebetween, the sleeves 55 and 75 will move away from each other so as to close both collets 52 and 53 simultaneously onto the work, this connection being in the nature of a floating connection so as to equalize the pressure on the work. When the sleeve 60 is moved to the right, bringing the tapering end 70 of the sleeve 60 out from between the rollers 72, a series of coil springs 85 act to pull the sleeves 55 and 75 together, thus drawing the collet hoods inwardly and releasing the spring fingers so as to release the work. These springs 85 surround screws 86 bearing between the heads 87 of these screws and posts 88 having their inner ends suitably secured, as by threading, into the sleeve 55. The inner ends of the screws 86 are threaded into suitable sockets 89 in the sleeve 75 and are secured in position therein as by the lock nuts 90. The sleeve 55 is journaled in a suitable taper bearing opening 95 in the turret wall member 30 and the sleeve 75 is similarly journaled in the wall member 17. All the work holders comprising the tubes 50 with their collet mechanisms are rotated through their engagement through a geared connection with the gear 40 by rotation of the shaft 36. In each indexed position of the turret one of the slidable blocks 64 associated with a work holder is so positioned that a finger 96 carried by an axially movable actuating bar 97 mounted adjacent to the turret engages in a slot therein. Movement of this bar 97 to the right, as shown in the drawing, moves the sleeve 60 so that the gear 61 moves out of mesh with the driving gear 40 which stops the rotation of the work. This motion of the bar 97 also acts to permit the work to be released by the action of the springs 85, the portion 70 riding out from engagement with the rollers 72. After new work has been inserted within the tube 50, motion of the bar 97 to the left serves to close the collets onto the work and to bring the gear 61 into mesh with the gear 40 so as to again couple the work holder for rotation and to clamp the work in the holder.

From the foregoing description of an embodiment of this invention it should be evident to those skilled in the art that various changes and modifications might be made without departing from the spirit or scope of the invention as defined by the appended claims.

I claim:

1. In combination, a tube, a spring collet carried by each end of said tube, a pair of sleeves slidable axially on said tube, each of said sleeves having a hood cooperating with one of said collets, a lever pivoted on one of said sleeves and engaging the other sleeve for forcing said sleeves simultaneously in opposite directions when said lever is swung in one direction to close their respective collets onto work extending through said tube, and spring means for moving said sleeves in the reverse directions to release said collets when said lever is swung in the opposite direction.

2. In combination, a tube within which work may be placed, means actuable to rotate said tube, a pair of work gripping means spaced apart axially of said tube, and means actuable in one manner to close both of said gripping means onto the work and to couple said tube for rotation by said rotating means and in another manner to uncouple said tube from said rotating means and to release the work.

3. In combination, a tube, a spring collet carried by each end of said tube, a pair of sleeves slidable axially on said tube, each of said sleeves having a hood cooperating with one of said collets, a lever pivoted on one of said sleeves and engaging the other sleeve for forcing said sleeves simultaneously in opposite directions when said lever is swung in one direction to close their respective collets onto work extending through said tube, spring means for moving said sleeves in the reverse directions to release said collets when said lever is swung in the opposite direction, a drive sleeve slidably keyed to said tube and having a cam portion engageable with said lever to swing said lever in collet closing direction, a rotary drive shaft, means acting on the moving of said drive sleeve into collet closed position to couple said drive sleeve to said shaft to be rotated thereby and thereby to rotate said tube and acting on the moving of said drive sleeve in the opposite direction to disconnect said drive sleeve from said shaft, and means actuable to move said drive sleeve.

FRANK L. CONE.